US008522637B2

(12) United States Patent
Hahn et al.

(10) Patent No.: US 8,522,637 B2
(45) Date of Patent: Sep. 3, 2013

(54) GEAR SHIFT LEVER WITH DAMPING DEVICE OF A VEHICLE (75) Inventors: Thorsten Hahn, Gau Odernheim (DE); Jochen Thur, Wiesbaden (DE)

(73) Assignee: GM Global Technology Operations LLC, Detroit, MI (US)

( * ) Notice: Subject to any disclaimer, the term of this patent is extended or adjusted under 35 U.S.C. 154(b) by 284 days.

(21) Appl. No.: 13/116,127

(22) Filed: May 26, 2011

(65) Prior Publication Data
US 2011/0290058 A1    Dec. 1, 2011

(30) Foreign Application Priority Data

May 26, 2010    (DE) .......................... 10 2010 021 559

(51) Int. Cl.
*G05G 1/00*    (2008.04)
(52) U.S. Cl.
USPC .......................... 74/470; 74/473.1; 74/473.28
(58) Field of Classification Search
USPC .......... 74/470, 471 R, 473.1, 473.24, 473.25, 74/473.26, 473.28
See application file for complete search history.

(56) References Cited

U.S. PATENT DOCUMENTS

| | | | | |
|---|---|---|---|---|
| 1,241,414 A * | 9/1917 | Masury et al. | ............. | 74/473.22 |
| 3,974,711 A | 8/1976 | Hurst, Jr. et al. | | |
| 4,576,059 A * | 3/1986 | Nishu et al. | ................ | 74/473.34 |
| 4,646,585 A | 3/1987 | Strohmeyer et al. | | |
| 4,693,135 A * | 9/1987 | LaRocca et al. | ............ | 74/473.21 |
| 4,916,966 A * | 4/1990 | Weishaupt et al. | ........ | 74/473.29 |
| 4,960,009 A * | 10/1990 | Schultz et al. | ............. | 74/473.29 |
| 5,144,852 A * | 9/1992 | Yokoyama | ................. | 74/473.36 |
| 5,247,848 A * | 9/1993 | Sabel | .......................... | 74/473.36 |
| 5,499,919 A * | 3/1996 | Thomas | .......................... | 434/45 |
| 5,560,252 A * | 10/1996 | Nishigai et al. | ............ | 74/473.36 |
| 7,178,795 B2 * | 2/2007 | Huprikar et al. | ........... | 267/141.1 |
| 7,464,621 B2 * | 12/2008 | Mathis et al. | ................ | 74/473.3 |
| 2004/0017035 A1 * | 1/2004 | Treder et al. | .................. | 267/220 |

FOREIGN PATENT DOCUMENTS

| | | |
|---|---|---|
| DE | 2004249 A1 | 7/1971 |
| DE | 8322840 U1 | 12/1983 |
| DE | 8437043 U1 | 4/1985 |
| DE | 10229287 A1 | 1/2004 |

OTHER PUBLICATIONS

German Patent Office, German Search Report for German Application No. 102010021559.7-26, dated Apr. 5, 2011.

* cited by examiner

*Primary Examiner* — David M Fenstermacher
(74) *Attorney, Agent, or Firm* — Ingrassia Fisher & Lorenz, P.C.

(57) ABSTRACT

A gear shift lever is provided with damping device of a vehicle. The damping device damps the returning of a reverse gear blocking element in the axial direction of the gear shift lever into a blocking position. For this, the damping device has a first rigid ring element in the axial direction of the gear shift lever, which surrounds the gear shift lever and has projections distributed on the periphery in axial direction. In addition, the damping device has a second rigid ring element, which has recesses in the region of the projections of the first ring element. On the reverse gear blocking element and on the gear shift lever, radial shoulders are arranged, against which the two rigid ring elements support themselves axially. Between the first and the second rigid ring element a rubber-elastic ring element is arranged which is deformable in a rubber-elastic manner between the projections of the first rigid ring element and the recesses of the second rigid ring element on the returning of a reverse gear blocking element.

11 Claims, 6 Drawing Sheets

Fig. 6

GEAR SHIFT LEVER WITH DAMPING DEVICE OF A VEHICLE

CROSS-REFERENCE TO RELATED APPLICATION

This application claims priority to German Patent Application No. 102010021559.7, filed May 26, 2010, which is incorporated herein by reference in its entirety.

TECHNICAL FIELD

The technical field relates to a gear shift lever with damping device of a vehicle. The damping device damps the returning of a reverse gear blocking element in axial direction of the gear shift lever into a blocking position. For this, the damping device has a rubber-elastic ring element in axial direction of the gear shift lever, which surrounds the gear shift lever.

BACKGROUND

Figure 6:
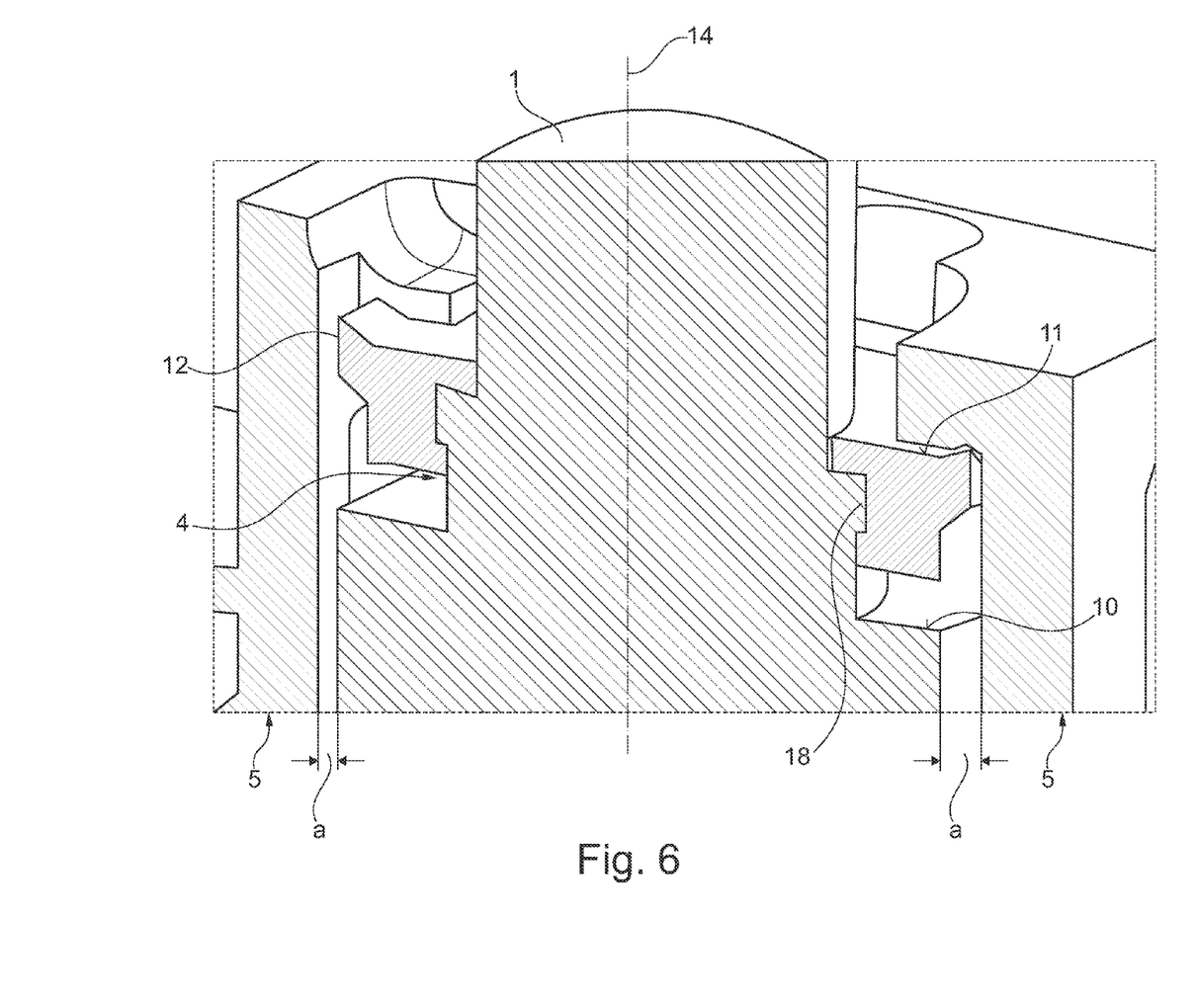
FIG. 6 shows a diagrammatic perspective view, partially in transverse section, of a partial region of a gear shift lever with a damping device according to the prior art.

A gear shift lever 1 with a damping device 4, which surrounds the gear shift lever 1 in the form of a rubber-elastic ring element 12, is shown by FIG. 6 in a diagrammatic perspective view, partially in section. In FIG. 6 a reverse gear blocking element 5 surrounds the gear shift lever 1 at a ring-shaped distance a. The reverse gear blocking element 5 has a ring-shaped shoulder 11 extending radially inwards. The gear lever 1 has a corresponding ring-shaped shoulder 10 extending radially outwards, which is configured such that the shoulders 10 and 11 meet each other on the returning of the reverse gear blocking element 5 into its blocking position. With this returning, however, a noise development can occur which is felt to be unpleasant when the shoulders 10 and 11 strike directly onto each other.

Therefore, in the prior art shown in FIG. 6, a damping device 4 in the form of a rubber-elastic ring element 12 surrounding the gear lever 1 is additionally provided between the shoulders 10 and 11. This flexible rubber-elastic ring element 12 is injected or vulcanized on a ring-shaped bead 18 of the gear shift lever 1. The shoulder 11 of the reverse gear blocking element 5 can therefore no longer strike directly onto the shoulder 10 of the axis-fixed gear shift lever on the axial return into the blocking position, as shown in FIG. 6.

A disadvantage of this damping device is that both the manufacture of the gear shift lever with the formation of the bead 18 and also the vulcanizing or injecting of a rubber-elastic ring element 12 onto this bead 18 is cost-intensive and requires additional manufacturing steps, especially since this rubber-elastic ring element 12 is not a standard component. If this rubber-elastic ring element 12 is replaced by a simple O-ring, it is found that the damping, during which the O-ring is merely squeezed, is not sufficient in order to reliably suppress the intrusive noise on the returning of the reverse gear blocking element 5 into the blocking position.

From U.S. Pat. No. 3,974,711 a gear shift lever arrangement is known, which makes possible a shifting into four forward gears and a reverse gear. For unblocking a reverse gear shift gate, a control button is provided in the vicinity of the knob of the gear shift lever for this gear shift lever arrangement. The control button is connected via a connecting cable with a reverse gear blocking element, so that the gear engagement into the reverse gear is only released on actuation of the control button. A disadvantage of this known gear shift lever arrangement is that a returning of the reverse gear blocking element into the initial state after decoupling of the reverse gear is not damped acoustically in any way, so that shifting noises occur which are felt to be intrusive in this known gear shift lever arrangement.

It is at least one object to overcome the disadvantages in the prior art and to create a gear shift lever with a damping device which is able to be produced at a favorable cost and efficiently damps the noise development on the returning of the reverse gear blocking element into its blocking position. In addition, other objects, desirable features and characteristics will become apparent from the subsequent summary and detailed description, and the appended claims, taken in conjunction with the accompanying drawings and this background.

SUMMARY

According to an embodiment, a gear shift lever with damping device of a vehicle is created. The damping device damps the returning of a reverse gear blocking element in the axial direction of the gear shift lever into a blocking position. For this, the damping device has a first rigid ring element in the axial direction of the gear shift lever, which surrounds the gear shift lever and has projections distributed on the periphery in the axial direction. In addition, the damping device has a second rigid ring element, which has recesses in the region of the projections of the first ring element. Radial shoulders are arranged on the reverse gear blocking element and on the gear shift lever, against which the two rigid ring elements support themselves axially. Between the first and the second rigid ring element, a rubber-elastic third ring element is arranged, which is deformable in a rubber-elastic manner between the projections of the first rigid ring element and the recesses of the second rigid ring element on the returning of a reverse gear blocking element.

This gear lever with damping device has the advantage that a rubber-elastic standardized ring element can be used as the damping element, so that in this region the gear shift lever does not have to be prepared with any bead for the vulcanizing or injecting on of a rubber-elastic ring element. In principle, both the costs of vulcanizing or injecting on, of shaping and processing the gear shift lever in the damping region can be saved. Only the shoulders of the reverse gear blocking element and of the gear shift lever, which are hitherto already present, which meet each in particular on the returning of a reverse gear blocking element, are to be varied in their design so that they have the two rigid ring elements with recesses and projections.

On the other hand, it is also possible that separate first and second rigid ring elements support themselves against the ring-shaped shoulders of the reverse gear blocking element and of the gear lever. Whereas in the first case an economically priced new design is necessary for the shoulders on the gear shift lever and on the reverse gear blocking element which, however, does not constitute an additional cost factor particularly in an injection-molded reverse gear blocking element, in the second case gear shift lever arrangements of a conventional type are equipped with the new damping device concept, by the two rigid ring elements and the one rubber-elastic ring element being included between the shoulders of the gear shift lever and the reverse gear blocking element.

For the reverse gear blocking element, provision is made that on engaging of the reverse gear, the element is pre-stressed in a spring-elastic manner in the axial direction of the gear shift lever. This spring-elastic pre-stressing is also the cause that on leaving the reverse gear shift channel, the reverse gear blocking element returns into the blocking position. However, through the rubber-elastic blocking element which is deformed in several directions by the new damping device, a highly effective damping is achieved, by which shift noises are almost completely damped.

In a further embodiment, the reverse gear blocking element is a rigid single-piece reverse gear stop block which surrounds the gear shift lever beneath a sleeve which covers a gear shift lever opening of a gear-changing console of the vehicle. The arrangement of the reverse gear blocking element as a rigid single-piece reverse gear stop block beneath the sleeve has the advantage that a short distance is to be bridged between an unblocking lever on the control knob of the gear shift lever and the reverse gear blocking element which is to be unblocked. A further advantage consists in that an exchanging or an incorporating of different damping device variants is possible with relatively little assembly effort.

As already mentioned, the gear shift lever has an unblocking lever for the reverse gear, which holds the reverse gear blocking element in a first position for blocking a reverse gear shift channel in the gearshift housing in a blocking position, and in a second position unlocks the reverse gear blocking element and with spring-elastic pre-stressing of the reverse gear blocking element releases the reverse gear shift channel in the gearshift housing. The activating of the reverse gear blocking element is achieved here in an advantageous manner with the unblocking lever in the region of the knob of the gear shift lever. On the other hand, it is also possible, by lifting or pressing again the entire shift lever, to cancel out the blocking function of a reverse gear stop block, wherein in these cases the returning of the gear shift lever into the blocking position can be damped in a sound-absorbing manner by the damping device of the application, which increases the driving comfort of the vehicle. Furthermore, provision is made that the two rigid ring elements have a hardening plastic, which is distinguished by the cross-linking of the polymer chains and is inherently stable. In order to additionally improve the tensile strength of the two rigid ring elements, a fiber-reinforced plastic can also be used.

In each case, it is advantageous to produce the reverse gear blocking element with a single injection molding step. It is of particular advantage here that one of the two rigid ring elements is an integral component of the reverse gear blocking element and the other of the two rigid ring elements is an integral component of the gear shift lever. Furthermore, provision is made to use an O-ring of an elastomer as the rubber-elastic third ring element. Such O-rings are standard components and can be supplied having different ductility and rubber-elasticity.

On the returning of the reverse gear blocking element into a blocking position, the rubber-elastic ring element is squeezed and bent several times axially owing to the shaping of the rigid ring elements, so that a distinctly larger volume area of the rubber-elastic ring element can be utilized for the damping, compared with rubber elements which merely dampen by means of a squeezing process. For this, provision is made that the projections of the first rigid ring element have rounded cams extending axially in the direction of the axis of the gear shift lever. Through the rounding, it is achieved that no sharp edges impair the lifespan of the rubber-elastic ring element.

In addition, it is possible that the rigid ring elements have undulating elevations and depressions, extending axially in the direction of the axis of the gear shift lever, which engage into each other and bend several times the rubber-elastic ring element arranged therebetween, whilst maintaining the inner radius of the rubber-elastic ring element. If the inner radius is maintained, then with the bending deformation of the rubber-elastic ring element an additional tensile load is to be expected, occurring uniformly in the ring element, which increases the damping effect alongside the tensile-compressive stresses with occur. However, the tensile load can be avoided, if a clearance fit between the gear shift lever and the internal diameter of the rubber-elastic ring element is configured to be large enough so that by radial reduction in size of the rubber-elastic ring element the tensile stresses are partially reduced owing to the elongation of the rubber-elastic ring element. Generally, provision is made to equip vehicles with such gear shift levers and damping devices, in order to improve the driving comfort for such vehicles.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
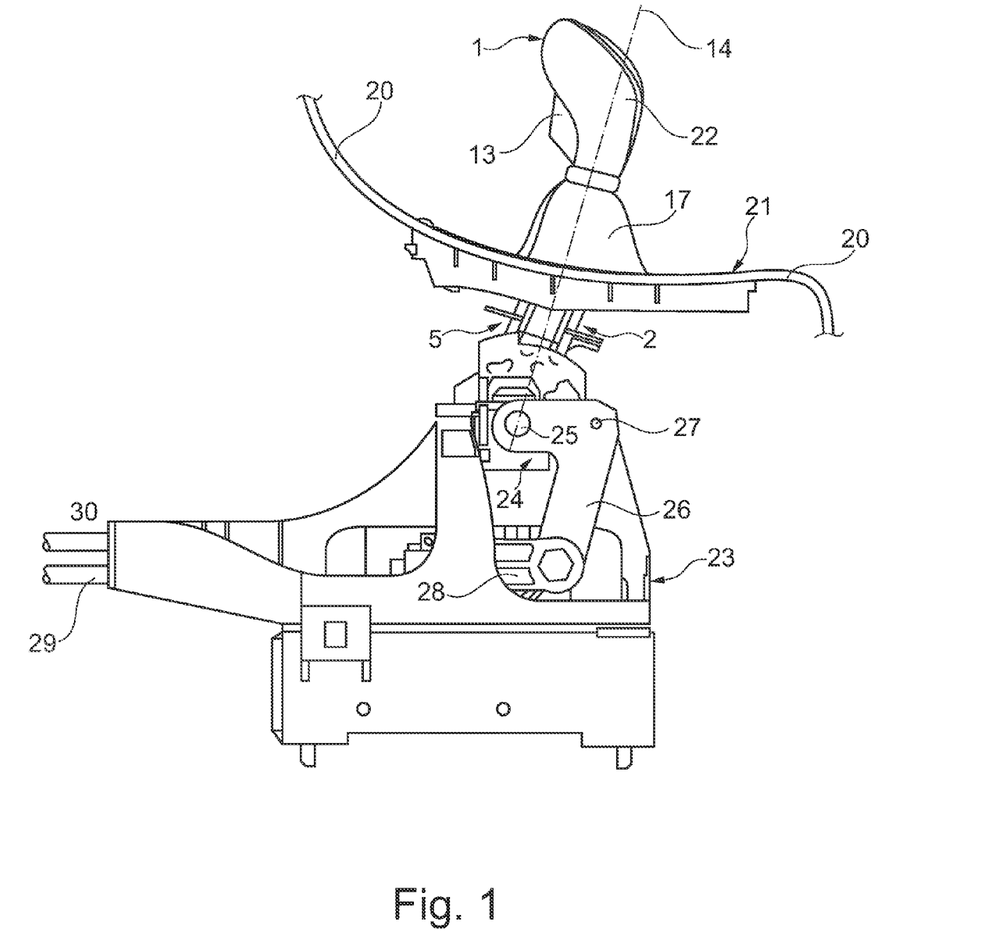
FIG. 1 shows a diagrammatic side view of a gear shift lever of a vehicle according to an embodiment.

FIG. 1 shows a diagrammatic side view of a gear shift lever 1 of a vehicle, which projects with its knob 22 out of an opening 21 of a gear-changing console 20. The opening 21 of the gear-changing console 20 is covered by a sleeve 17, so that the actual gearshift housing 23 with the gearshift mechanism 24 is concealed for the drivers. The shift lever 1 has a shift lever axis 14, which is able to be pivoted into the plane of the drawing and out of the plane of the drawing with a spherical cap of the gearshift mechanism 24 in a free-run channel of a gearshift gate, and for shift channels in the gearshift gate in the direction of the left page edge and in the direction of the right page edge.

For the free-run channel, a shift finger 25, arranged on the ball joint of the gear shift lever 1 and projecting out from the plane of the drawing, is articulately connected with a rocker lever 26, wherein the rocker lever 26 pivots about a fixed journal 27 of the gearshift housing 23 and in so doing moves a push rod arrangement 28, the longitudinal movements of which are transferred via one of the pressure-tension cables 29 or 30 to corresponding rocker levers of the manual gearbox of the vehicle. An extension of the gear shift lever 1 beneath the spherical cap is articulately connected with a further gear shift linkage, which transfers the movements of the gear shift lever 1 in the individual shift channels into a longitudinal movement, so that another of the two pressure-tension cables 29 or 30 can transfer these longitudinal movements to corresponding input levers of the manual gearbox, which is not shown here.

In order to prevent a shifting from one of the forward gears directly into the reverse gear, the shift gate of the reverse gear is blocked by a reverse gear blocking element 5, wherein the reverse gear blocking element 5 can be lifted under spring-elastic pre-stressing by means of an unlocking lever 13 on the knob 22 of the gear shift lever. After release of the shift gate to the reverse gear, the reverse gear blocking element 5 remains pre-stressed, although the unblocking lever 13 is already disengaged. On returning of the gear shift lever 1 into the free-run gear, the reverse gear blocking element 5 falls back into the blocking position and in so doing is damped by a damping device 2 such that intrusive gear shift noises are avoided. This damping device 2 is explained in further detail in two embodiments in the following figures.

Figure 2:
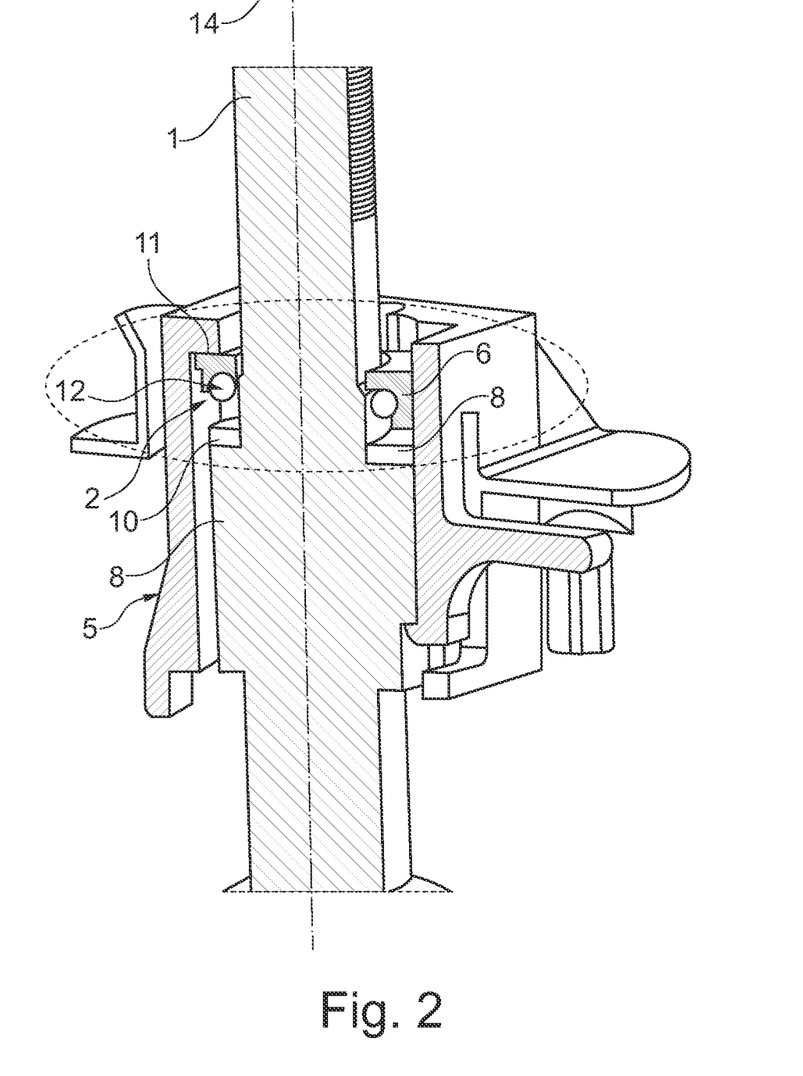
FIG. 2 shows a diagrammatic perspective view, partially in transverse section, of a partial region of a gear shift lever according to FIG. 1.

FIG. 2 shows a diagrammatic perspective view, partially in transverse section, of a partial region of a gear shift lever 1 according to FIG. 1. In the partial region which is shown, the gear shift lever 1 is completely surrounded by the reverse gear blocking element 5, wherein the reverse gear blocking element 5 is constructed here as a single-piece stop block, which can be lifted by means of the unblocking lever 13, shown in FIG. 1, with respect to the gear shift lever 1, and can be pre-stressed in a spring-elastic manner, in order to be able to pivot the gear shift lever 1 out from the blocking position which is shown here into a shift channel of the reverse gear.

When the gear shift lever 1 is pivoted back, the single-piece reverse gear stop block springs back into the blocking position which is shown here, wherein a stop 11 of the reverse gear blocking element 5 impinges onto the damping device 2, which in this first embodiment of the invention consists of a first rigid ring element 6, onto which the shoulder 10 of the reverse gear blocking element impinges, and of a second rigid ring element 8, which supports itself on a shoulder 10 of the gear shift lever 1. Between the two rigid ring elements 6 and 8, a rubber-elastic third ring element 12 is arranged, which dampens this return of the reverse gear blocking element 5, wherein the rubber-elastic third ring element 12 is not only squeezed, but is additionally axially deformed. The following figures show this.

Figure 3:
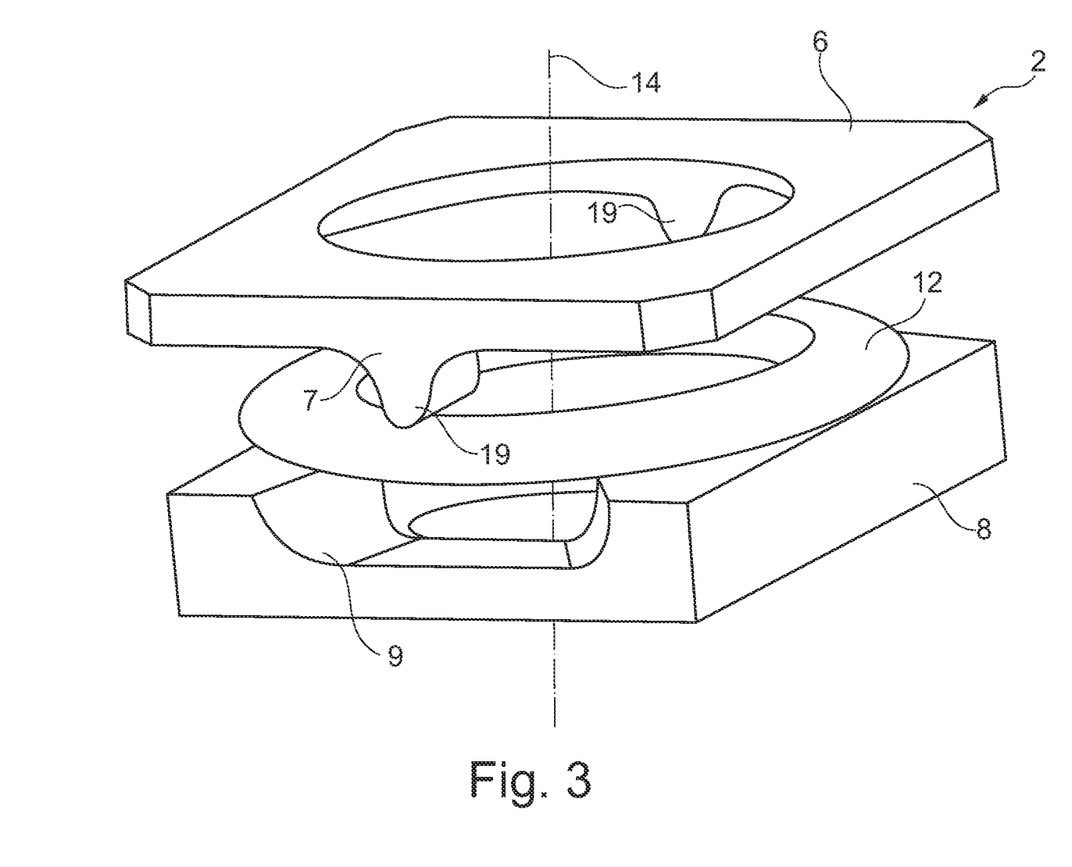
FIG. 3 shows a diagrammatic perspective view of a first embodiment of a damping device of the gear shift lever according to FIG. 1.

FIG. 3 shows a diagrammatic perspective view of a first embodiment of a damping device 2 of the gear shift lever 1. The first rigid ring element 6, which surrounds the gear shift lever and cooperates with a shoulder of the reverse gear blocking element, in this embodiment of the invention has projections 7 in the form of rounded cams 19. These projections 7 or respectively cams 19 correspond with recesses 9 of a second rigid ring segment 8 which supports itself against a shoulder of the gear shift lever 1. On the returning of the reverse gear blocking element, the latter presses the first rigid ring element 6 of the damping device with its projections 7 onto a rubber-elastic third rubber-elastic ring element 12, arranged between the two rigid ring elements 6 and 8, so that it is pressed into the recess 9 of the second rigid ring element and in so doing is deformed in axial direction in addition to the squeeze damping.

So that no noises occur between the shoulder of the returning reverse gear blocking element and the first rigid ring element 6, this ring element is either an integral component of the single-piece reverse gear stop block or is at least connected in a firmly bonded manner with the shoulder of the reverse gear blocking element. The same applies to the second rigid ring element 8, which is either connected in a firmly bonded manner with the shoulder of the gear shift lever or forms an integral component of the gear shift lever.

Figure 4:
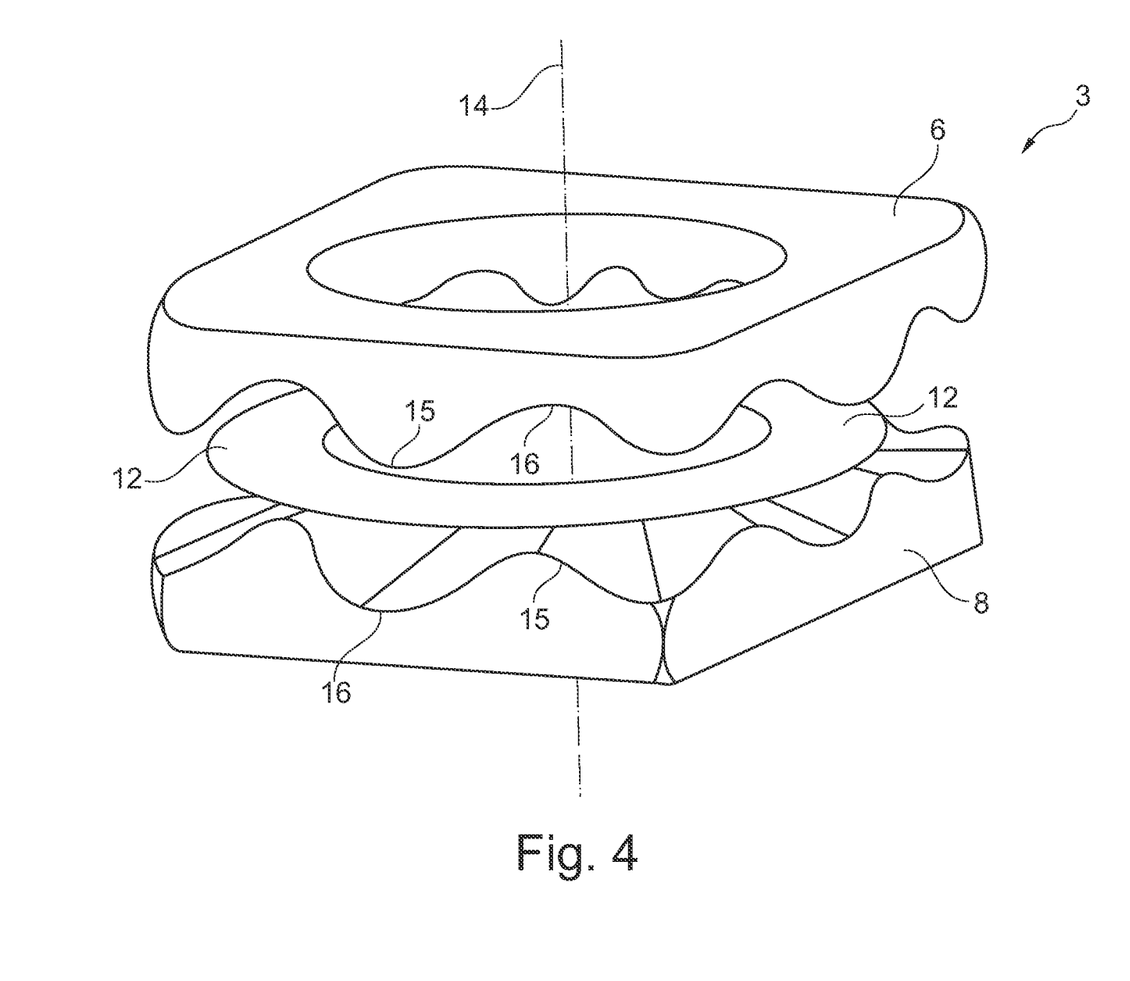
FIG. 4 shows a diagrammatic perspective view of a second embodiment of a damping device of the gear shift lever according to FIG. 1.

FIG. 4 shows a diagrammatic perspective view of a second embodiment of a damping device 3 of the gear shift lever 1 according to FIG. 1. Components with identical functions as in the preceding figures are marked by the same reference numbers and are not the subject of extra discussion. This second embodiment of the damping device 3 differs from the first embodiment shown in FIG. 3 in that the first rigid ring element 6 now has axially extending, undulating elevations 15 and depressions 16, and the second rigid ring element 8 has elevations 15 and depressions 16 matching this, so that on the returning of the reverse gear blocking element, the rubber-elastic third ring element 12 is bent several times axially.

Figure 5:
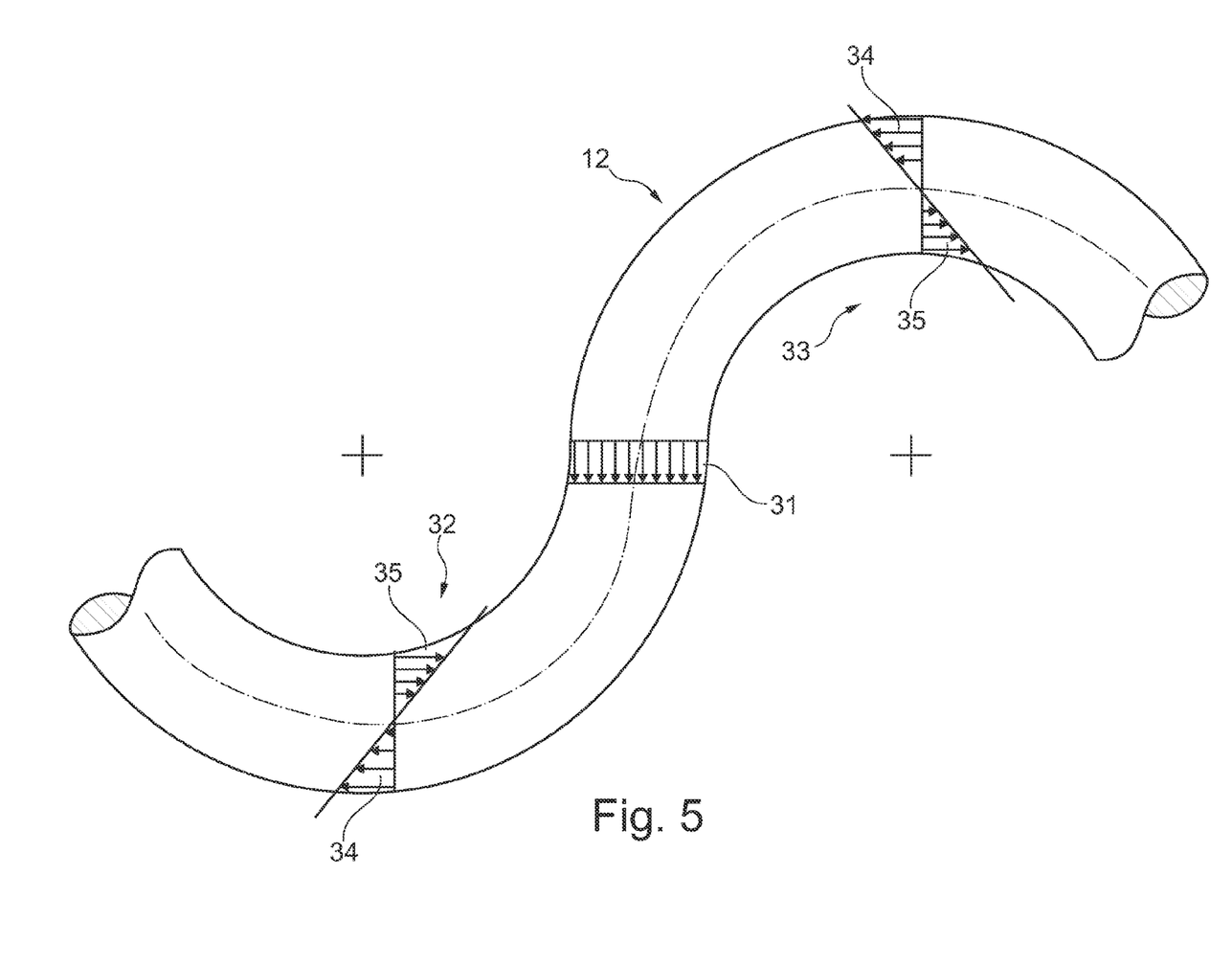
FIG. 5 shows diagrammatically states of stress in a ring section of a rubber-elastic third ring element, bent in axial direction.

FIG. 5 shows diagrammatically tension states in a ring section of a rubber-elastic third ring element 12 which is bent in axial direction. When this ring element 12 lies closely against the gear shift lever before the damping process, so that the inner radius can not alter, the rubber-elastic ring element 12 is extended in its length owing to the axial bends which occur in the case of damping, so that it is exposed to consistent tensile stresses 31 in the entire volume. In addition, tensile stresses 34 and compressive stresses 35 occur in the bend regions 32 and 33, which stresses are superimposed with the tensile stresses 31. Therefore, in addition to the damping by squeezing, additional damping regions are used in the volume of the rubber-elastic ring element, in order to increase the damping with increasing deformation of the rubber-elastic ring element. The consistent tensile stress 31 occurring by elongation of the rubber-elastic ring element 12 can be reduced, when the fitting tolerance between the internal diameter of the rubber-elastic ring element 12 and the external diameter of the gear shift lever in the region of the damping device is increased.

FIG. 6 shows a diagrammatic perspective view, partially in transverse section, of a partial region of a gear shift lever with a damping device according to the prior art, as has already been discussed in the introduction, so that a repetition is not necessary at this point.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A gear shift lever for a vehicle, comprising:
a reverse gear blocking element configured to turn in an axial direction of the gear shift lever into a blocking position;
a damping device configured to dampen when the reverse gear blocking element is turned in the axial direction of the gear shift lever into the reverse gear blocking element,
a first rigid ring element of the damping device in the axial direction of the gear shift lever that surrounds the gear shift lever and comprises projections distributed on a periphery in the axial direction;
a second rigid ring element comprising recesses in a region of the projections of the first rigid ring element;

radial shoulders are arranged on the reverse gear blocking element and the gear shift lever against which the first rigid ring element and the second rigid ring element are supported axially; and a rubber-elastic third ring element is arranged between the first rigid ring element and the second rigid ring element that is deformable in a rubber-elastic manner between the projections of the first rigid ring element and the recesses of the second rigid ring element on returning of the reverse gear blocking element.

2. The gear shift lever according to claim 1, wherein the reverse gear blocking element is pre-stressed in a spring-elastic manner in the axial direction of the gear shift lever after engaging of a reverse gear.

3. The gear shift lever according to claim 1, wherein the reverse gear blocking element is a rigid, single-piece reverse gear stop block that surrounds the gear shift lever beneath a sleeve, which covers an opening of the gear shift lever of a gear-changing console.

4. The gear shift lever according to claim 1,
wherein the gear shift lever comprises an unblocking lever for a reverse gear that holds the reverse gear blocking element in a first position for blocking a reverse gear shift channel in a gearshift housing in the blocking position, and in a second position unlocks the reverse gear blocking element and releases the reverse gear shift channel in the gearshift housing under spring-elastic pre-stressing of the reverse gear blocking element.

5. The gear shift lever according to claim 1, wherein the first rigid ring element and the second rigid ring element have a hardening plastic.

6. The gear shift lever according to claim 1, wherein the first rigid ring element and the second rigid ring element have a fiber-reinforced plastic.

7. The gear shift lever according to claim 1, wherein the first rigid ring element is an integral component of the gear shift lever and the second rigid ring element is the integral component of the reverse gear blocking element.

8. The gear shift lever according to claim 1, wherein the rubber-elastic third ring element is an O-ring of an elastomer.

9. The gear shift lever according to claim 8, wherein in a damping phase on returning into the blocking position of the reverse gear blocking element, a rubber-elastic ring element is squeezed together and bent axially several times.

10. The gear shift lever according to claim 1, wherein the projections comprise rounded cams extending axially in a direction of an axis of the gear shift lever.

11. The gear shift lever according to claim 1, wherein the first rigid ring element and the second rigid ring element comprise undulating elevations and depressions extending axially in a direction of an axis of the gear shift lever, which engage each other and bend the rubber-elastic third ring element several times that is mounted there between, whilst maintaining a inner radius of a rubber-elastic ring element.

* * * * *